United States Patent
Feng et al.

(10) Patent No.: US 8,224,252 B2
(45) Date of Patent: Jul. 17, 2012

(54) INTER-CELL INTERFERENCE COORDINATION METHOD AND BASE STATION

(75) Inventors: Minghai Feng, Beijing (CN); Xiaoming She, Beijing (CN); Lan Chen, Beijing (CN); Wenbo Wang, Beijing (CN); Mugen Peng, Beijing (CN); Dong Liang, Beijing (CN); Song Zhu, Beijing (CN)

(73) Assignee: NTT Docomo, Inc., Tokyo (JP)

( * ) Notice: Subject to any disclaimer, the term of this patent is extended or adjusted under 35 U.S.C. 154(b) by 277 days.

(21) Appl. No.: 12/796,484

(22) Filed: Jun. 8, 2010

(65) Prior Publication Data

US 2011/0045856 A1 Feb. 24, 2011

(30) Foreign Application Priority Data

Aug. 19, 2009 (CN) .......................... 2009 1 0167053

(51) Int. Cl.
*H04B 15/00* (2006.01)
*H04W 24/00* (2009.01)

(52) U.S. Cl. ..................... 455/63.1; 455/501; 455/452.2; 455/69

(58) Field of Classification Search ................. 455/63.1, 455/450, 452.1, 452.2, 561, 501, 509, 453, 455/67.11, 67.7, 69, 522; 370/252, 328
See application file for complete search history.

(56) References Cited

U.S. PATENT DOCUMENTS

| | | | |
|---|---|---|---|
| 7,924,777 B2* | 4/2011 | Kim et al. | 370/328 |
| 8,150,443 B2* | 4/2012 | Pedersen et al. | 455/522 |
| 2009/0179755 A1* | 7/2009 | Bachl et al. | 455/405 |
| 2010/0317355 A1* | 12/2010 | Zangi et al. | 455/450 |

* cited by examiner

*Primary Examiner* — John J Lee
(74) *Attorney, Agent, or Firm* — Blakely Sokoloff Taylor & Zafman, LLP

(57) ABSTRACT

An inter-cell interference coordination method comprises: measuring an interference over thermal noise of a first subcarrier resource block in an uplink direction and obtaining an interference over thermal noise measurement value by a first base station; judging whether a first high interference indicating message is received from a second base station when the interference over thermal noise measurement value is larger than a first preset threshold value by the first base station; sending an overload indicator message to the second base station which has sent the high interference indicating message or shielding the first subcarrier resource block by the first base station when the first high interference indicating message is received; and sending the overload indicator message to base stations to which all the neighboring cells belong by the first base station when the first high interference indicating message is not received. The overhead at X2 interface is reduced according to the present invention.

12 Claims, 3 Drawing Sheets

INTER-CELL INTERFERENCE COORDINATION METHOD AND BASE STATION

PRIORITY

The present application claims priority to and incorporates by reference the entire contents of Chinese patent application No. 200910167053.1, filed in China on Aug. 19, 2009.

BACKGROUND OF THE INVENTION

1. Field of the Invention

Embodiments of the present invention relate to a mobile communication system, and especially to an inter-cell interference coordination method and base station.

2. Description of the Prior Art

The future wireless communication system will adopt OFDM (Orthogonal Frequency Division Multiple Access) technology or single carrier technology as multiple access mode so as to improve the frequency spectrum efficiency. In the uplink, the adoption of the above technologies will make uplink inter-cell interference have the characteristics of non-white noise and fluctuating with the resource allocation and user scheduling. Therefore, in the above system, a method for coordinative resource allocation and user scheduling between neighboring cells is needed so as to reduce the inter-cell interference impact.

Therefore, an OI (Overload Indication) message at X2 interface is defined in the LTE (Long Term Evolution) standardization work to exchange the interference information between neighboring cells and to assist the resource allocation and user scheduling between cells.

The interference control based on OI message is an afterward processing mechanism and its processing procedure is shown in FIG. 1, which includes the following steps.

In step 11, the first base station measures the IOT (Interference over thermal noise) from other interfering cells in the uplink direction.

In step 12, the first base station judges whether the IOT measurement value is larger than the preset threshold value and if yes, proceeds to step 13; otherwise, returns to step 11.

In step 13, the first base station sends the OI message to the second base station to which the neighboring cell belongs via the X2 interface.

In step 14, the second base station which has received the OI message judges whether the user in the cell belonging to the second base station is the main factor causing the high inter-cell interference and if yes, proceeds to step 15; otherwise, no processing will be taken (not shown in FIG. 1).

In step 15, the second base station reduces the transmitting power of the user in the cell belonging to the second base station causing the inter-cell interference high or schedules the user to other subcarriers.

In the OI message, the interference on each subcarrier block is represented by two bits and three levels.

The neighboring cells may exchange information of interference and user scheduling through the OI message so as to reduce the inter-cell interference. However, the related art has the following disadvantages.

The overhead of the interference control method based on the OI message is very large. Since the user who causes the interference to the cell of the first base station exceed the preset threshold value may be in any cell neighboring to the cell of the first base station, the OI message should be sent to each neighboring cell to find the source of the interference. In the case of 10 MHz bandwidth and 50 subcarrier resource blocks, the first base station needs to send all together 600-bit (50*2*6) OI message overhead to the neighboring 6 cells, i.e. 12-bit message overhead for any one of the subcarrier resource blocks.

SUMMARY OF THE INVENTION

An advantage of at least one embodiment of the present invention is to provide an inter-cell interference coordination method and base station, which may guarantee the inter-cell interference coordination performance while reducing the overhead needed at the X2 interface.

In order to achieve the above advantage, an embodiment of the present invention provides an inter-cell interference coordination method, comprising:

measuring an interference over thermal noise of a first subcarrier resource block in an uplink direction and obtaining an interference over thermal noise measurement value by a first base station;

determining whether a first high interference indicating message is received from a second base station when the interference over thermal noise measurement value is larger than a first preset threshold value by the first base station, wherein the first high interference indicating message indicates that a user at a border of a cell of the second base station who is adjacent to the first base station is scheduled to the first subcarrier resource block;

sending an overload indicator message to the second base station which has sent the high interference indicating message or shielding the first subcarrier resource block by the first base station when the first high interference indicating message is received; and sending the overload indicator message to base stations to which all the neighboring cells belong by the first base station when the first high interference indicating message is not received.

According to the above inter-cell interference coordination method, the step of sending an overload indicator message to the second base station which has sent the high interference indicating message or shielding the first subcarrier resource block by the first base station when the first high interference indicating message is received specifically comprises:

sending the overload indicator message to the second base station which has sent the first high interference indicating message by the first base station when a number of received high interference indicating messages is smaller than or equivalent to a second preset threshold; and shielding the first subcarrier resource block by the first base station when the number of received high interference indicating messages is larger than the second preset threshold.

In one embodiment, the above inter-cell interference coordination method further comprises:

sending a second high interference indicating message to a third base station by the first base station when a user adjacent a border of a cell of the third base station is scheduled to a second subcarrier resource block, wherein the second high interference indicating message indicates that the user adjacent the border of the cell of the third base station is scheduled to the second subcarrier resource block.

In one embodiment, the above inter-cell interference coordination method further comprises:

judging whether a user in a cell causes a high inter-cell interference by the second base station when an overload indicator message is received from another base station and if yes, reducing a transmitting power of the user in the cell causing the high inter-cell interference or changing a subcarrier resource block for the user who causes the high inter-cell interference by the second base station.

In order to achieve the above objective, the present invention provides a base station, comprising:

a measurement module, for measuring an interference over thermal noise of a first subcarrier resource block in an uplink direction and obtaining an interference over thermal noise measurement value;

a judging module, for determining whether a first high interference indicating message is received from a second base station when the interference over thermal noise measurement value is larger than a first preset threshold value, wherein the first high interference indicating message indicates that a user at a border of a cell of the second base station who is adjacent to the first base station is scheduled to the first subcarrier resource block;

a first coordination module, for sending an overload indicator message to the second base station which has sent the high interference indicating message or shielding the first subcarrier resource block when the first high interference indicating message is received; and a second coordination module, for sending the overload indicator message to base stations to which all the neighboring cells belong when the first high interference indicating message is not received.

According to one embodiment of the above base station, the first coordination module specifically comprises:

a first message sending module, for sending the overload indicator message to the second base station which has sent the first high interference indicating message when a number of received high interference indicating messages is smaller than or equivalent to a second preset threshold; and a shielding module, for shielding the first subcarrier resource block when the number of received high interference indicating messages is larger than the second preset threshold.

In one embodiment, the above base station further comprises: a second message sending module, for sending a second high interference indicating message to a third base station when a user adjacent a border of a cell of the third base station is scheduled to a second subcarrier resource block, wherein the second high interference indicating message indicates that the user adjacent the border of the cell of the third base station is scheduled to the second subcarrier resource block.

In one embodiment, the above base station further comprises: an interference cancelling module, for reducing a transmitting power of a user in a cell causing a high inter-cell interference or changing a subcarrier resource block for the user who causes the high inter-cell interference when an overload indicator message is received from another base station.

An embodiment of the present invention has the following advantages. According to one embodiment of the present invention, if another base station finds a user at the border of its own cell is scheduled to the first subcarrier resource block, it will send the HII message to the base station to which a neighboring cell adjacent to the user at the border of the cell belongs so that the OI message may be sent purposely or the resource scheduling processing may be performed purposely. In addition, the base station who finds IOT measurement value exceeds the threshold value may send the OI message selectively or even may not send the OI message, which may reduce the overhead at the X2 interface greatly as compared to sending the OI message to all the neighboring cells according to the prior art.

DETAILED DESCRIPTION OF THE PREFERRED EMBODIMENTS

According to the inter-cell interference coordination method and the base station according to an embodiment of the present invention, if a user on the border of a cell is scheduled to a first subcarrier resource block, a first base station will send a HII message to a second base station to which a neighboring cell adjacent to the border of the cell via an X2 interface, while when the first base station measures that an IOT measurement value from other interfering cells in an uplink direction is larger than a preset threshold value, it will determine a sending mode of an OI message by judging the receiving status of the HII message and reduce an overhead needed at the X2 interface while guaranteeing the inter-cell interference coordination performance.

Figure 1:
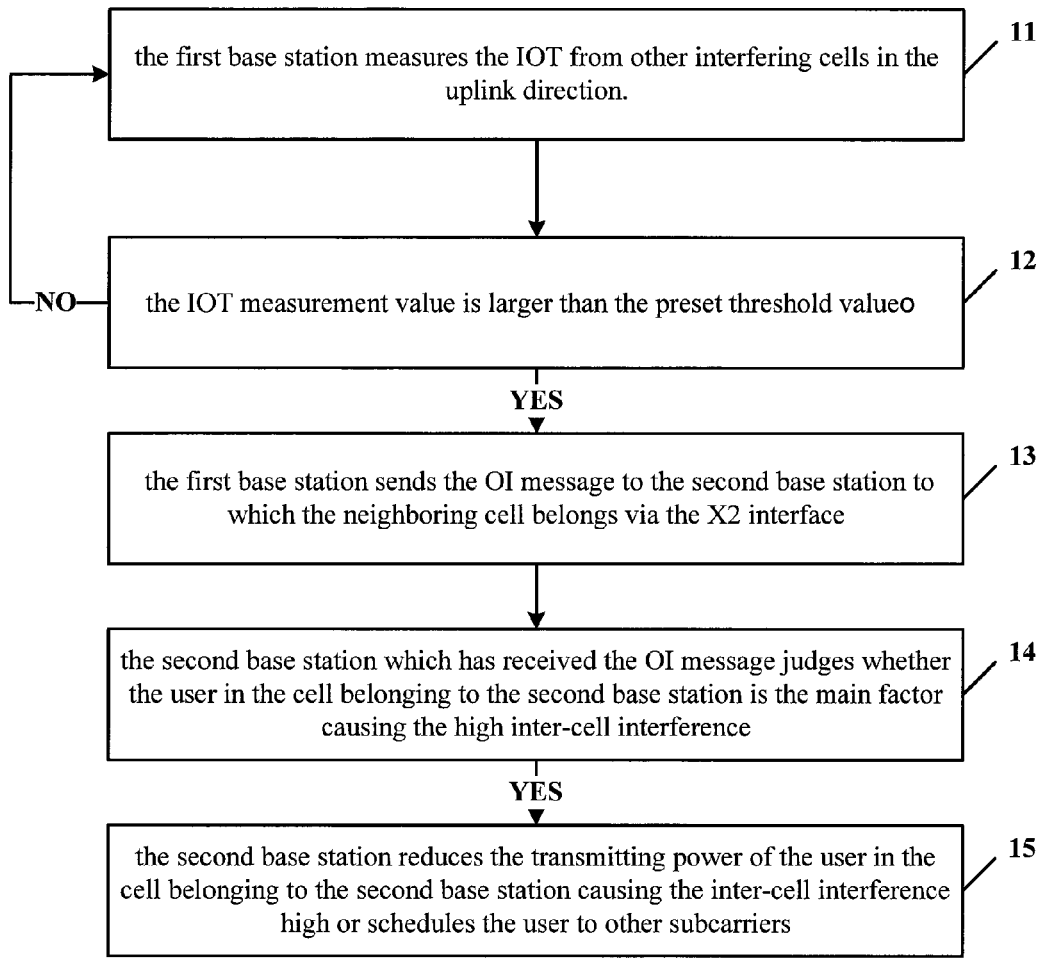
FIG. 1 is a flow chart showing interference control based on an OI message.
Figure 2:
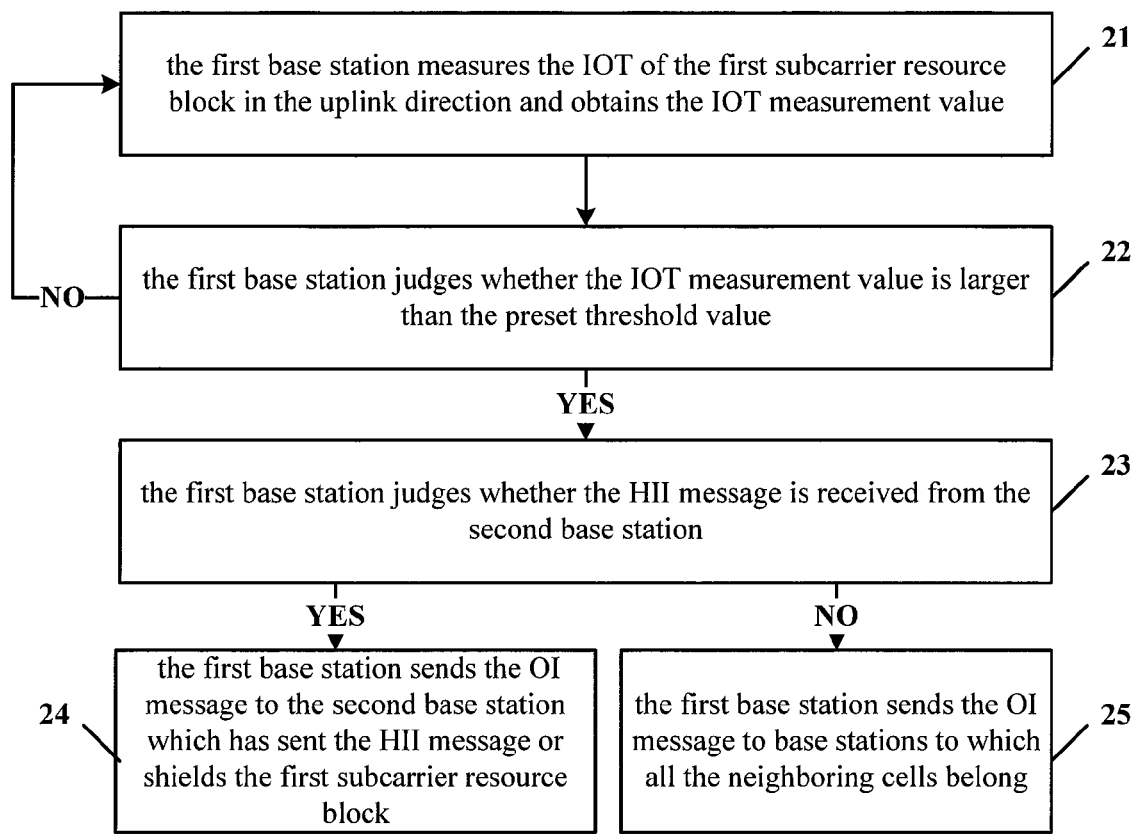
FIG. 2 is a flow chart showing inter-cell interference coordination method according to an embodiment of the present invention.

FIG. 2 is a flow chart showing an inter-cell interference coordination method according to a first embodiment of the present invention. The method includes the following steps.

In step 21, the first base station measures the IOT of the first subcarrier resource block in the uplink direction and obtains the IOT measurement value.

In step 22, the first base station determines whether the IOT measurement value is larger than the preset threshold value and if yes, proceeds to step 23; otherwise, returns to step 21.

In step 23, the first base station judges whether the HII message is received from the second base station, wherein the HII message indicates that the user at the border of the cell of the second base station who is adjacent to the first base station is scheduled to the first subcarrier resource block, and if yes, proceeds to step 24; otherwise, proceeds to step 25.

In step 24, the first base station sends the OI message to the second base station which has sent the HII message or shields the first subcarrier resource block.

In step 25, the first base station sends the OI message to base stations to which all the neighboring cells belong.

According to the embodiment of the present invention, if another base station finds a user at the border of its own cell is scheduled to the first subcarrier resource block, it will send the HII message to the base station to which a neighboring cell adjacent to the user at the border of the cell belongs so that the OI message may be sent purposely or the resource scheduling processing may be performed purposely. In addition, the base station who finds IOT measurement value exceeds the threshold value may send the OI message selectively or even may not send the OI message, which may reduce the overhead at the X2 interface greatly as compared to sending the OI message to all the neighboring cells according to the prior art.

According to the above description, we may find that for each subcarrier resource block, only one bit is needed for the HII message to indicate whether the user at the cell border is scheduled to the subcarrier resource block and only when the user at the cell border is scheduled to the subcarrier resource block can the HII message be triggered, the overhead in sending the HII message is very small.

The base stations finding the IOT measurement value exceeding the threshold may only send the OI message to the base station sending the HII message or even may not send the OI message, which may reduce the overhead at the X2 interface greatly (with more than 50% reduction) as compared to sending the OI message to all the neighboring cells according to the prior art.

At the same time, since the inter-cell interference is mainly caused by the user at the cell border, as long as the user at the cell border is scheduled to any subcarrier resource block, the base station may notify by sending the HII message. The base station that sends the HII message may receive the OI message sent from the base stations whose measurement value exceeds the threshold. Therefore, the method according to an embodiment of the invention may reduce the inter-cell interference greatly.

Of course, the second base station may need to perform the following operations. When a user adjacent the border of the cell of the third base station is scheduled to the second subcarrier resource block, the second base station sends the second high interference indicating message to the third base station, indicating that the user adjacent the border of the cell of the third base station is scheduled to the second subcarrier resource block.

Furthermore, the second base station may perform the following operations. When receiving the OI message, the second base station judges whether the user in the cell belonging to the second base station causes the high inter-cell interference and if yes, the second base station reduces the transmitting power of the user in the cell belonging to the second base station causing the inter-cell interference high or changes the subcarrier for the user who causes the high inter-cell interference.

Figure 3:
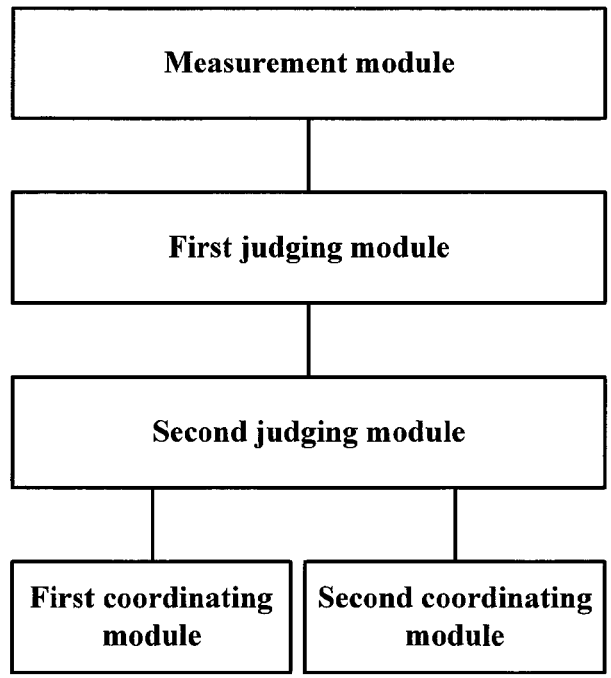
FIG. 3 is a schematic diagram showing a structure of a base station according to the embodiment of the invention.

The base station according to the first embodiment of the present invention is shown in FIG. 3 and includes the following modules.

A measuring module is for measuring the IOT of the first subcarrier resource block in the uplink direction and obtains the IOT measurement value.

A first judging module is for determining whether the IOT measurement value is larger than the preset threshold value and obtaining a first judging result.

A second judging module is for determining whether the HII message is received from the second base station when the first judging result indicates that the IOT measurement value is larger than the first preset threshold value and obtaining a second judging result, wherein the HII message indicates that the user at the border of the cell of the second base station who is adjacent to the first base station is scheduled to the first subcarrier resource block.

A first coordination module is for sending the OI message to the second base station which has sent the HII message or shields the first subcarrier resource block when the second judging result indicates the HII message is received.

A second coordination module is for sending the OI message to base stations to which all the neighboring cells belong when the second judging result indicates the HII message is not received.

According to the first embodiment of the present invention, the OI message is sent to the second base station which has sent the HII message or the first subcarrier resource block is shielded when the second judging result indicates the HII message is received. The two methods can both reduce the inter-cell interference as illustrated below.

If the OI message is sent to the second base station which has sent the HII message, when the second base station receives the OI message, it will determine whether the user in the cell belonging to the second base station is the main factor causing the inter-cell interference high and if yes, the second base station will reduce the transmit power for the user or schedule the user to the other subcarrier resource block. Therefore, the interference may be reduced. In addition, shielding the first subcarrier resource block makes the first subcarrier resource block not allocated to any user and thus the interference is cancelled also.

However, if base stations exceeding the present number (for example, 5) send the HII message to the first base station, at this time, if the OI message is sent to all the base stations who have sent the HII message, all the base stations should perform the judging operation. At this time, the first base station shielding the first subcarrier resource block will make the number of the operations reduced and the number of the influenced base stations is reduced. Therefore, according to the first embodiment, the first coordination module specifically includes the following components.

A number judging unit is for determining whether the number of the received HII messages is larger than a second preset threshold when the second judging result indicates the HII message is received and for obtaining a third judging result.

A first message sending module is for sending the OI message to the second base station which has sent the HII message when the third judging result indicates that the number of the received HII messages is smaller than or equivalent to the second preset threshold.

A shielding module is for shielding the first subcarrier resource block when the third judging result indicates that the number of the received HII messages is larger than the second preset threshold.

The first preset threshold may be set according to the practical requirement, such as 1, 2, 3 or 4 but optimally the middle value of 3.

Of course, as a bi-directional interactive subject, the base station further includes a second message sending module and an interference cancelling module.

When a user adjacent the border of the cell of the third base station is scheduled to the second subcarrier resource block, the second message sending module sends the second high interference indicating (HII) message to the third base station, indicating that the user adjacent the border of the cell of the third base station is scheduled to the second subcarrier resource block.

When receiving the OI message, the interference cancelling module reduces the transmitting power of the user in the cell causing the inter-cell interference high or changes the subcarrier resource block for the user who causes the high inter-cell interference.

According to the above embodiment, one of the subcarrier resource blocks is used as an example and in the following, embodiments of the present invention will be illustrated in an overall point of view.

As shown in the following table, the base station records the following information for each HII message received.

Sender of the HII message (base station information): for sending the OI message to the sender of the HII message when the IOT measurement value is larger than the present value; and resource blocks related to the HII message.

The whole table is shown below:

|  | RB 1 | RB 2 | ... | RB N |
|---|---|---|---|---|
| Neighboring cell 1 | 1 | 0 | ... | 1 |
| Neighboring cell 2 | 1 | 1 | ... | 0 |
| ... | ... | ... | ... | ... |
| Neighboring cell M − 1 | 0 | 1 | ... | 0 |
| Neighboring cell M | 1 | 0 | ... | 0 |

Taken RB1 as an example, when the measured IOT of the RB1 in the uplink direction is larger than the preset threshold, the base station will look up the above table and judges the number of "1" in the column of RB1. If the number is 0, the base station will sends the OI message to all the neighboring cells. If the number is larger than 0, the base station will continue to determine whether the number of "1" in the column of RB1 is larger than 3 and if yes, the base station will shield RB1 directly; otherwise, the base station will send the OI message to the neighboring cells corresponding to the "1" in the column of RB1.

For example, 4 HII messages from neighboring cells are received on RB2. Since the number is larger than 3 (preset HII number threshold), the base station will not send the OI message to the neighboring cells but leave the subcarrier in the cell unoccupied so as to reduce interference on neighboring cells. Since the HII messages from cell 1 and cell M are received on RB N, the base station only sends the OI message to cell 1 and cell M.

According to the embodiment of the present invention, the overhead practically needed at the X2 interface is reduced, the accuracy of coordinative control between cells is improved and the system performance is enhanced by using OI signaling and HII signaling in combination.

The effect of the embodiment of the present invention is illustrated below by simulation.

The system level simulation parameters are as following:

| Network architecture | 19 base stations, 57 sectors |
|---|---|
| Distance between base stations | 500 m |
| Physical resource block number/sector | 50 |
| Scheduling sub-band | 5 resource blocks |
| UE number/sector | 10 |
| Subcarrier frequency | 2 GHz |
| Path loss model | 128.1 + 37.6 * log10(km) |
| System bandwidth | 10 MHz FDD |
| UE maximum transmit power | 250 mW |
| Fixed target SINR | 10 dB |
| HII number threshold | 3 |
| IOT threshold | 10 dB |
| Traffic model | Full buffer |
| X2 interface overhead | OI: 2 bit/resource block, HII: 1 bit/resource block |

The following table shows a comparison of cell average throughput and cell edge average throughput between a method not adopting the inter-cell coordination, an interference control method based on the OI message and the method according to an embodiment of the present invention. This table shows that compared with the method not adopting the inter-cell coordination, the method according to an embodiment of the present invention may provide 10.5% and 17.2% gains on cell average throughput and cell edge average throughput respectively and the gains are higher than those of the interference control method based on the OI message.

|  | cell average throughput | | cell edge average throughput | |
|---|---|---|---|---|
|  | Measurement value (kbps) | Comparative gain | Measurement value (kbps) | Comparative gain |
| method not adopting the inter-cell coordination | 391.4 | 0 | 144.2 | 0 |
| interference control method based on the OI message | 416.3 | 6.4% | 152.3 | 5.6% |
| interference control method based on the HII message | 385.2 | −1.6% | 162.4 | 12.6% |
| method according to the embodiment of the present invention | 432.7 | 10.5% | 169.1 | 17.2% |

Figure 4:
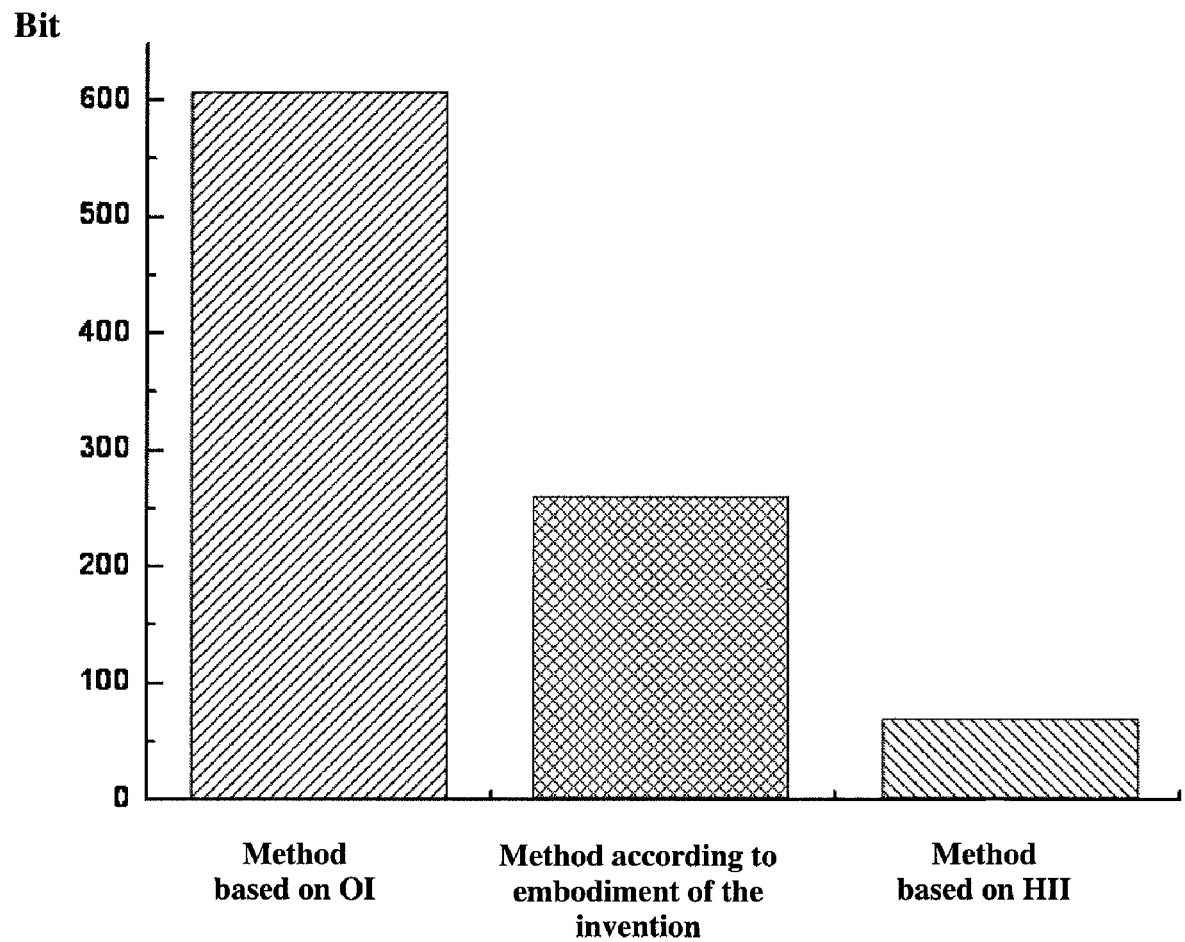
FIG. 4 is a simulation result diagram showing an overhead at the X2 interface according to the method of the present invention.

FIG. 4 is a simulation result diagram showing an overhead at the X2 interface according to the interference control method based on the OI message and according to the method of an embodiment of the present invention. It can be seen that the overhead according to the method of the embodiment of the present invention is less than 50% of that according to the interference control method based on the OI message.

The above are only preferred embodiments of the present invention. It should be understood that for those skilled in the art, various improvements and modifications can be made without departing from the principle of the present invention and should be regarded as within the protection scope of the present invention.

What is claimed is:

1. An inter-cell interference coordination method, comprising:
    measuring an interference over thermal noise of a first subcarrier resource block in an uplink direction and obtaining an interference over thermal noise measurement value by a first base station;
    determining whether a first high interference indicating message is received from a second base station when the interference over thermal noise measurement value is larger than a first preset threshold value by the first base station, wherein the first high interference indicating message indicates that a user at a border of a cell of the second base station who is adjacent to the first base station is scheduled to the first subcarrier resource block;
    sending an overload indicator message to the second base station which has sent the high interference indicating message or shielding the first subcarrier resource block by the first base station when the first high interference indicating message is received; and
    sending the overload indicator message to base stations to which all the neighboring cells belong by the first base station when the first high interference indicating message is not received.

2. The inter-cell interference coordination method according to claim 1, wherein sending an overload indicator message to the second base station which has sent the high interference indicating message or shielding the first subcarrier resource block by the first base station when the first high interference indicating message is received further comprises:
    sending the overload indicator message to the second base station that has sent the first high interference indicating message by the first base station when a number of received high interference indicating messages is smaller than or equivalent to a second preset threshold; and shielding the first subcarrier resource block by the first base station when the number of received high interference indicating messages is larger than the second preset threshold.

3. The inter-cell interference coordination method according to claim 2, further comprising:

sending a second high interference indicating message to a third base station by the first base station when a user adjacent a border of a cell of the third base station is scheduled to a second subcarrier resource block, wherein the second high interference indicating message indicates that the user adjacent the border of the cell of the third base station is scheduled to the second subcarrier resource block.

4. The inter-cell interference coordination method according to claim 2, further comprising:

determining whether a user in a cell causes a high inter-cell interference by the second base station when an overload indicator message is received from another base station and if yes, reducing a transmitting power of the user in the cell causing the high inter-cell interference or changing a subcarrier resource block for the user who causes the high inter-cell interference by the second base station.

5. The inter-cell interference coordination method according to claim 1, further comprising:

sending a second high interference indicating message to a third base station by the first base station when a user adjacent a border of a cell of the third base station is scheduled to a second subcarrier resource block, wherein the second high interference indicating message indicates that the user adjacent the border of the cell of the third base station is scheduled to the second subcarrier resource block.

6. The inter-cell interference coordination method according to claim 1, further comprising:

determining whether a user in a cell causes a high inter-cell interference by the second base station when an overload indicator message is received from another base station and if yes, reducing a transmitting power of the user in the cell causing the high inter-cell interference or changing a subcarrier resource block for the user who causes the high inter-cell interference by the second base station.

7. A base station, comprising:

a measurement module to measure an interference over thermal noise of a first subcarrier resource block in an uplink direction and obtaining an interference over thermal noise measurement value;

a judging module to determine whether a first high interference indicating message is received from a second base station when the interference over thermal noise measurement value is larger than a first preset threshold value, wherein the first high interference indicating message indicates that a user at a border of a cell of the second base station who is adjacent to the first base station is scheduled to the first subcarrier resource block;

a first coordination module to send an overload indicator message to the second base station which has sent the high interference indicating message or shielding the first subcarrier resource block when the first high interference indicating message is received; and a second coordination module to send the overload indicator message to base stations to which all the neighboring cells belong when the first high interference indicating message is not received.

8. The base station according to claim 7, wherein the first coordination module further comprises:

a first message sending module to send the overload indicator message to the second base station which has sent the first high interference indicating message when a number of received high interference indicating messages is smaller than or equivalent to a second preset threshold; and a shielding module to shield the first subcarrier resource block when the number of received high interference indicating messages is larger than the second preset threshold.

9. The base station according to claim 8, further comprising:

a second message sending module to send a second high interference indicating message to a third base station when a user adjacent a border of a cell of the third base station is scheduled to a second subcarrier resource block, wherein the second high interference indicating message indicates that the user adjacent the border of the cell of the third base station is scheduled to the second subcarrier resource block.

10. The base station according to claim 8, further comprising:

an interference cancelling module to reduce a transmitting power of a user in a cell causing a high inter-cell interference or changing a subcarrier resource block for the user who causes the high inter-cell interference when an overload indicator message is received.

11. The base station according to claim 7, further comprising:

a second message sending module to send a second high interference indicating message to a third base station when a user adjacent a border of a cell of the third base station is scheduled to a second subcarrier resource block, wherein the second high interference indicating message indicates that the user adjacent the border of the cell of the third base station is scheduled to the second subcarrier resource block.

12. The base station according to claim 7, further comprising:

an interference cancelling module to reduce a transmitting power of a user in a cell causing a high inter-cell interference or changing a subcarrier resource block for the user who causes the high inter-cell interference when an overload indicator message is received.

* * * * *